Oct. 22, 1957 F. C. ALBRIGHT 2,810,535
ANTI-SKIP DEVICE FOR AIRCRAFT LANDING GEAR
Filed May 4, 1950 3 Sheets-Sheet 1

INVENTOR.
FRANKLIN C. ALBRIGHT
BY
ATTORNEY

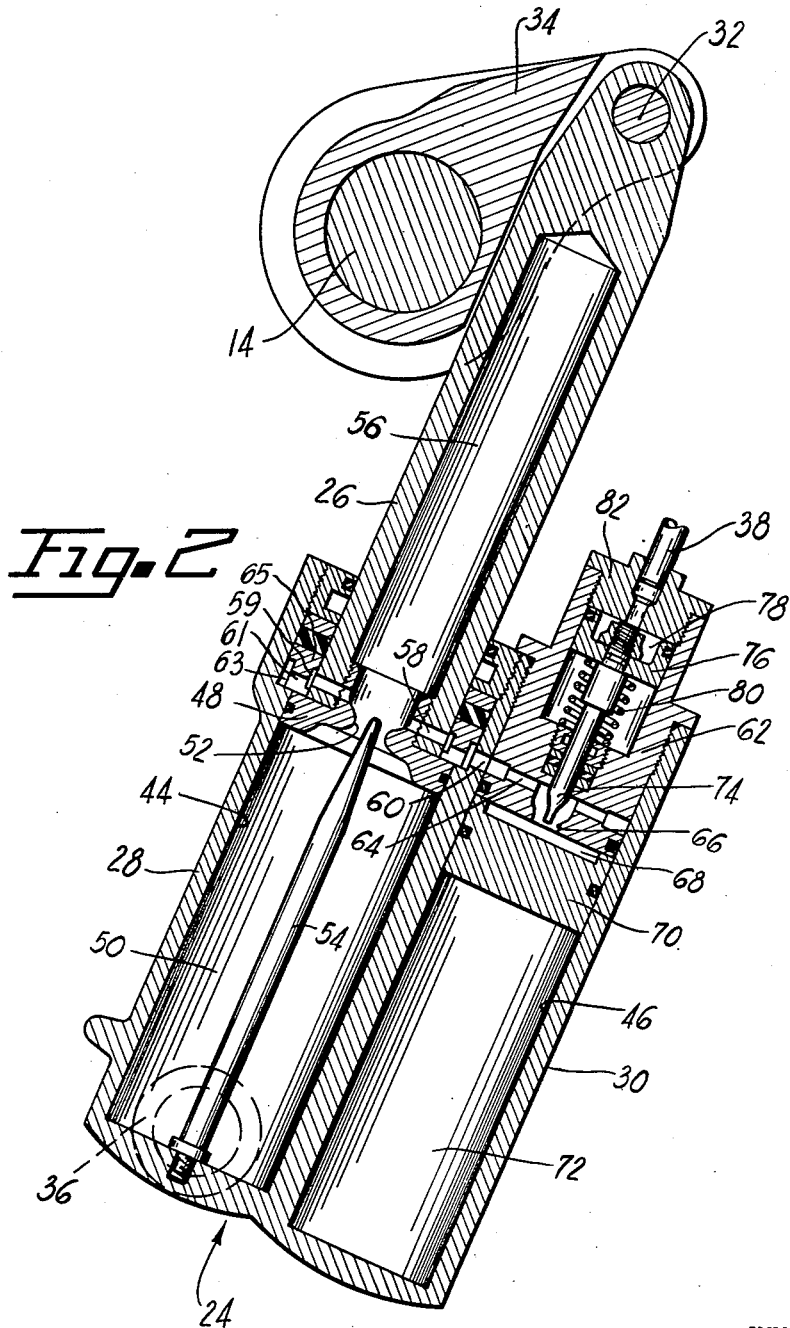

Oct. 22, 1957    F. C. ALBRIGHT    2,810,535
ANTI-SKIP DEVICE FOR AIRCRAFT LANDING GEAR
Filed May 4, 1950    3 Sheets-Sheet 3

INVENTOR.
FRANKLIN C. ALBRIGHT
BY
T. J. Plante
ATTORNEY

United States Patent Office 2,810,535
Patented Oct. 22, 1957

2,810,535

ANTI-SKIP DEVICE FOR AIRCRAFT LANDING GEAR

Franklin C. Albright, South Bend, Ind., assignor to Bendix Aviation Corporation, South Bend, Ind., a corporation of Delaware Application May 4, 1950, Serial No. 159,986

19 Claims. (Cl. 244—104)

This invention relates to a device which tends to eliminate the "skipping" effect of a landing gear of the "swing back" type, i. e. a landing gear having a "trailing" wheel which moves both rearward and upward under load.

The wheel, or other ground-engaging element, of a "swing back" landing gear is usually pivotally supported at the lower end of a fixed strut which extends downward from the body of the aircraft, and a telescoping shock absorber is pivotally connected at one end to the fixed strut and at the other end to the ground-engaging element. This arrangement has certain advantages over the conventional construction, in which the ground-engaging element can move only vertically with respect to the aircraft, and in which the shock absorbing action is obtained by a direct telescoping connection between a wheel-carrying lower strut element and an upper strut element secured to the body of the aircraft.

One advantage of the "swing back" landing gear is the elimination of bending load on the shock absorber. The action of the shock absorber is smoother and more consistent because its operation is not subject to varying amounts of mechanical friction induced by bending strains. Furthermore, in a "swing back" landing gear, drag loads are introduced into the shock absorber, instead of being applied at right angles to the shock absorber element, as in the conventional shock strut. An improvement in the riding qualities of the aircraft during taxying results from the smoother action of the shock absorber and from the absorption of drag loads.

An inherent problem in the "swing back" landing gear is its tendency to "skip," owing to deflection under braking drag. The telescoping movement of the shock absorber under drag load is desirable when the wheel is not being braked, but during braking its effect is likely to be detrimental. As the brake is applied, a drag load is developed, which tends to cause the wheel to swing upward, thereby reducing the vertical load. Reduction of the vertical load momentarily reduces the frictional action of the ground on the wheel, thereby tending to cause skidding. When the force tending to compress the shock absorber is temporarily reduced, or eliminated, the resilient shock absorber abruptly forces the wheel back into engagement with the ground. The on-and-off pulsating action of the shock absorber and brake may lead to a "walking," or "skipping," tendency of the aircraft, due to alternating wheel-lifting movements, occurring first on one side of the aircraft and then on the other.

The primary object of the present invention is to provide a device which tends to eliminate the "skipping" action of a "swing back" landing gear. Broadly speaking, I propose to obtain the desired result by varying the resistance of the shock absorber in accordance with the effectiveness of the brake. More specifically, I propose to subject a pressure responsive member to a pressure proportional to the brake applying pressure, and to cause the effective size of a shock absorber orifice to be reduced by movement of said member under pressure.

The above and other objects and features of the invention will appear more fully hereinafter from a consideration of the following description, taken in connection with the accompanying drawings, wherein a plurality of embodiments of the invention are illustrated, by way of example. In the drawings:

Figure 2 is a sectional view showing the internal construction of the shock absorber used in the landing gear of Figure 1;

Figures 1, 3:
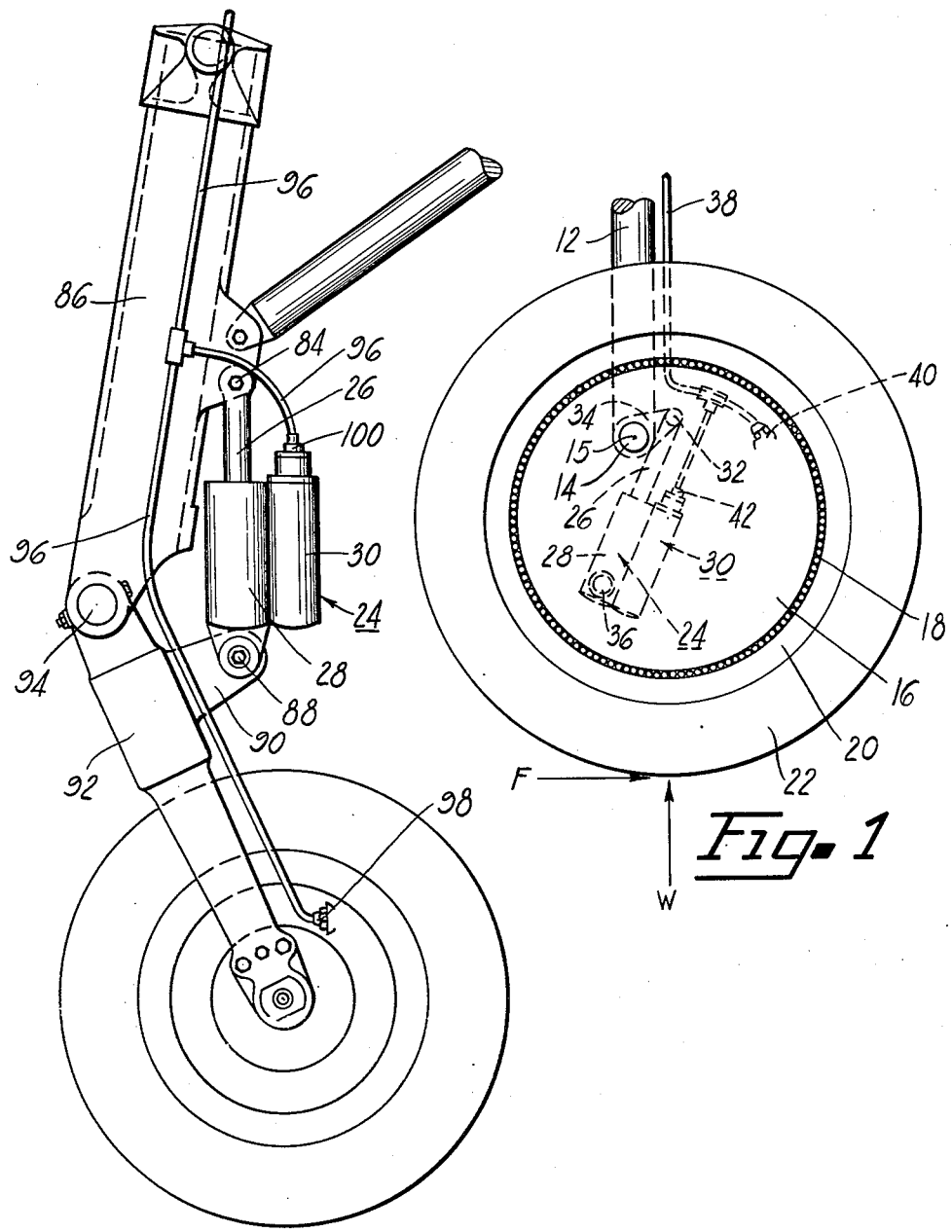
Figure 1 is a side elevation showing the general outline of an aircraft landing gear which incorporates my invention.
Figure 3 is a side elevation showing the incorporation of the shock absorber of Figure 2 in a landing gear differing somewhat from the landing gear of Figure 1.
Figure 4:
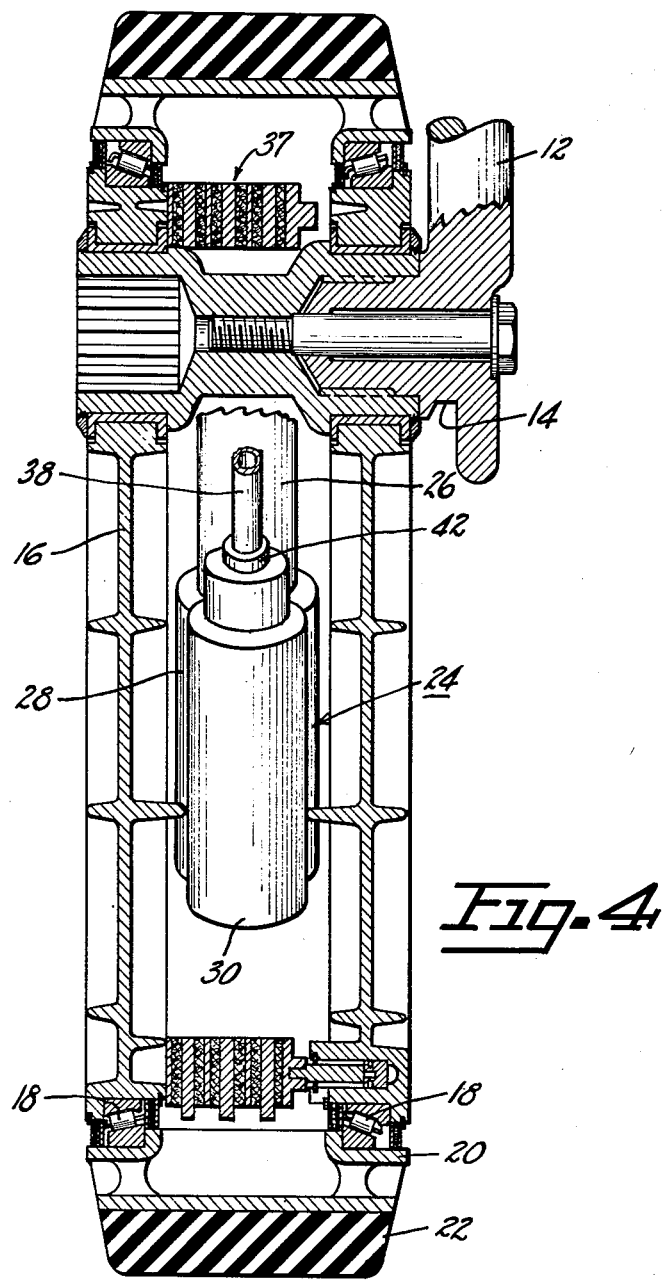
Figure 4 is a sectional view showing the arrangement of the shock absorber of Figure 2 in a wheel and brake assembly.

The landing gear construction illustrated in Figure 1 is similar to that shown and claimed in my application serial No. 127,937, filed November 17, 1949, now Patent No. 2,568,696, the entire working structure of the energy-dissipating mechanism, including both the shock absorber and the structural means for causing telescoping movement of the shock absorber parts, being located within the confines of the wheel assembly.

As shown in Figure 1, a strut 12, which extends downward from the body of the aircraft, has at its lower end a laterally-extending nonrotatable axle 14. A large-diameter wheel-supporting hub 16 is pivotally mounted on axle 14, the pivotal center 15 of the hub on the axle being above and ahead of the axis of the hub. Two axially-spaced large-diameter bearings 18 are supported on the periphery of the hub, and a wheel or ground-engaging element 20, carrying a tire 22, is rotatably mounted on the bearings.

A shock absorber 24 is mounted inside hub 16. The shock absorber comprises two telescopically associated members 26 and 28, and an additional member 30, which may be formed as a lateral extension of the casing of member 28, as shown. Shock absorber member 26 is pivotally connected at 32 to an arm 34, which is non-rotatably secured to axle 14. Shock absorber member 28 is pivotally connected at 36 to hub 16.

The shock absorber 24 absorbs or dissipates the energy produced by either a vertical or aft force, or any combination of these forces, when applied to the tire 22. Since forward movement of the aircraft corresponds to movement toward the left in Figure 1, the wheel is a "trailing," or "swing back," wheel. Either an aft force F or a vertical force W will cause the axis, or center, of hub 16 to move in an arc about center point 15. During this movement of the hub, pivot point 32 at one end of the shock absorber remains stationary, and pivot point 36 at the other end of the shock absorber moves with the hub in an arc centered at 15, thus shortening the shock absorber under the influence of the force acting on the tire.

A brake assembly 37 is mounted inside the hub 16. The brake, which is preferably a disk brake operated either by hydraulic pressure or by air pressure, is located between the bearings 18 and the shock absorber 24. In other words, the brake assembly encircles the shock absorber, and is encircled by the bearings. A conduit 38 connects the source of brake applying pressure, located in the body of the aircraft, to the brake actuator inlet 40. Conduit 38 is also connected to an inlet 42 provided in the upper end of member 30 of the shock absorber. The reason for connecting the brake pressure line to the shock absorber will become apparent as the description progresses.

As shown in detail in Figure 2, the shock absorber unit has two cylindrical bores 44 and 46, which may be formed on parallel axes in a single casing. A piston member 48 is reciprocable in bore 44, said piston member and the portion of the casing in which it reciprocates constituting a telescopic shock absorber which shortens as the wheel moves rearward and upward about the pivotal center 15. As the shock absorber shortens, piston member 48 moves into chamber 50, reducing the volume of the chamber and forcing liquid (with which chamber 50 is filled) through the outlet or metering orifice 52. As the liquid is forced through the metering orifice, the energy tending to compress the shock absorber is gradually dissipated, in the conventional manner. If necessary, a metering pin 54 may cooperate with the orifice 52 to vary the resistance of the shock absorber in accordance with the amount of telescoping movement.

Since chamber 56, which is formed inside member 26, is also filled with liquid, the liquid forced through orifice 52 moves through passages 58 in piston member 48 and opening 60 in the wall between bores 44 and 46. With the members in the relative positions shown, flow is from passages 58 to opening 60 through an annular groove 59, radial passages 61 and annular groove 63 in spacer ring 65. It should be noted that as piston member 48 moves into chamber 50, an elongated annular spacing is formed between the outside wall of member 26 and the periphery of bore 44. This spacing will necessarily be in communication with groove 63 and passage 61 and will, therefore, fill with fluid as the unit shortens in length. A fixed plug member 62 closes the open end of bore 46, and provides a passage 64 which communicates with opening 60. The fixed plug member 62 also has a metering orifice 66, through which liquid flows after traversing passages 58, 60, and 64. Finally the liquid enters chamber 68 and exerts its pressure against a floating piston 70. Downward movement of piston 70 is resisted by suitable resilient means located in chamber 72, such as a helical metal spring or the more commonly used air spring. The energy which is stored in the spring in chamber 72 during compression tends ot move the shock absorber toward extended position after its compression stroke has been completed.

The effective size of metering orifice 66 is controlled by a substantially tapered metering pin 74, which is reciprocably mounted in the center of plug member 62 in such a way that the end of the metering pin can enter the orifice to reduce the opening. The metering pin is adapted to be urged toward the orifice by pressure acting on a piston or actuator 76, which may be secured to the end of the metering pin, as shown. Piston 76 is urged toward the orifice whenever fluid under pressure enters chamber 78 from the brake pressure line 38. A spring 80 tends to hold piston 76 and metering pin 74 in retracted position, with the piston in engagement with cap 82.

The operation of the shock absorbing device is as follows. When the aircraft is landing and when it is taxying with the brakes released, the operation of the shock absorber follows the conventional pattern. The metering pin 74 is preferably so located that it permits relatively free flow through orifice 66. Orifice 52, when the brakes are not being applied (i. e., normally), is the smaller of the two orifices, and accounts for substantially all of the energy-dissipating effect. Thus metering pin 54 and orifice 52 cooperate to provide the desired shock absorber effect when the aircraft lands, and the spring in chamber 72 provides the desired cushioning effect during taxying.

Whenever pressure is applied to the brake associated with wheel 20, the same unit pressure is transmitted to chamber 78, developing a force on piston 76 proportional to the brake applying force. The force on piston 76 tends to move metering pin 74 toward orifice 66, acting against the resistance of spring 80. The amount of movement of the metering pin depends upon the severity of the brake applying pressure. As the brake pressure is increased the metering pin is moved toward the orifice, causing a reduction in the effective size of the orifice, and an increase in the resistance of the orifice to flow of liquid in the shock absorber.

With this arrangement, the shock absorber is automatically made "stiffer," i. e. its ability to shorten is restricted, whenever brake applying pressure is exerted. Ground drag resulting from application of the brakes is thus resisted more strongly when it tends to compress the shock absorber. In this manner, any tendency of the wheel to "skip" is effectively counteracted. Complete prevention of the "skipping" tendency can be insured by proper choice of the relative sizes of orifice 66, metering pin 74, and piston 76, for a given installation.

In cases where metering pin 54 is not needed, the metering device 66—74 can be included in the main portion of the shock absorber (i. e. in member 26), provided the available space is adequate. Furthermore, in some instances, it would be possible to dispense with the orifice 52, and accomplish the entire function with a single orifice and metering pin (or other orifice-controlling device).

Figure 3 shows the incorporation of my "anti-skip" shock absorber in a "swing back" landing gear in which the shock absorber is not mounted inside the hub of the wheel. In this arrangement, the same shock absorber construction is shown, piston member 26 being pivotally connected at 84 to a strut 86, and cylinder member 28 being pivotally connected at 88 to an arm 90 formed on a wheel-carrying lever member 92. Lever member 92 is pivotally connected at 94 to the lower end of strut 86. The brake pressure line 96 is connected to the brake actuator by inlet fitting 98, and to the auxiliary portion 30 of the shock absorber by inlet fitting 100. Operation of the shock absorber in this environment is substantially the same as its operation in the structure of Figure 1.

Although certain particular embodiments of my invention have been described, it will be understood by those skilled in the art that the objects of the invention may be attained by the use of constructions different in certain respects from those disclosed without departing from the underlying principles of the invention.

I claim:

1. For use in an aircraft landing gear comprising a strut adapted to be connected at its upper end to the body of the aircraft, a ground-engaging element which is pivotally supported on the lower end of the strut and which is arranged to "swing back" under load, and a fluid pressure operated brake associated with the ground-engaging element; a device for opposing "swing back" movement of the ground-engaging element comprising a casing having two parallel cylindrical bores, a piston member reciprocable in the first bore, said piston member and the portion of said casing in which it reciprocates constituting a telescopic shock absorber which shortens as the ground-engaging element "swings back," one end of the shock absorber being pivotally connected to the strut and the other end of the shock absorber being pivotally connected to the ground-engaging element, said shock absorber having a metering orifice through which liquid is forced when the shock absorber is shortened, a first metering pin cooperating with said orifice to vary the resistance of the shock absorber in accordance with the amount of telescoping movement, a fixed member in the second bore having a metering orifice which communicates with the first metering orifice so that the liquid must be displaced through both orifices, a second metering pin associated with the second metering orifice and arranged to reduce the effective area of said orifice as the pin is moved in a given direction, a piston operatively connected to the second metering pin and acted on by a pressure proportional to the pressure acting on the brake, the piston being urged in the orifice-reducing direction as the brake pressure increases, a spring arranged to resist orifice-reducing movement of the piston, a floating piston in the second bore acted on by the liquid metered through the two orifices, and a spring resisting movement of the floating piston caused by the pressure of said metered liquid.

2. For use in an aircraft landing gear comprising a strut adapted to be connected at its upper end to the body of the aircraft, a ground-engaging element which is pivotally supported on the lower end of the strut and which is arranged to "swing back" under load, and a fluid pressure operated brake associated with the ground-engaging element; a device for opposing "swing back" movement of the ground-engaging element comprising a casing having two cylindrical bores, a piston member reciprocable in the first bore, said piston member and the portion of said casing in which it reciprocates constituting a telescopic shock absorber which shortens as the ground-engaging element "swings back," one end of the shock absorber being pivotally connected to the strut and the other end of the shock absorber being pivotally connected to the ground-engaging element, said shock absorber having a metering orifice through which liquid is forced when the shock absorber is shortened, a fixed member in the second bore having a metering orifice which communicates with the first metering orifice so that the liquid must be displaced through both orifices, a metering pin associated with the second metering orifice and arranged to reduce the effective area of said orifice as the pin is moved in a given direction, a piston operatively connected to the metering pin and acted on by a pressure proportional to the pressure acting on the brake, the piston being urged in the orifice-reducing direction as the brake pressure increases, a spring arranged to resist orifice-reducing movement of the piston, a floating piston in the second bore acted on by the liquid metered through the two orifices, and a spring resisting movement of the floating piston caused by pressure of said metered liquid.

3. For use in an aircraft landing gear comprising a strut adapted to be connected at its upper end to the body of the aircraft, a ground-engaging element which is pivotally supported on the lower end of the strut and which is arranged to "swing back" under load, and a fluid pressure operated brake associated with the ground-engaging element; a device for opposing "swing back" movement of the ground-engaging element comprising a casing having a cylindrical bore, a piston member reciprocable in the bore, said piston member and said casing constituting a telescopic shock absorber which shortens as the ground-engaging element "swings back," one end of the shock absorber being pivotally connected to the strut and the other end of the shock absorber being pivotally connected to the ground-engaging element, said shock absorber having a metering orifice through which liquid is forced when the shock absorber is shortened, a member providing a second metering orifice which communicates with the first metering orifice so that the liquid must be displaced through both orifices, a metering pin associated with the second metering orifice and arranged to reduce the effective area of said orifice as the pin is moved in a given direction, a piston operatively connected to the metering pin and acted on by a pressure proportional to the pressure acting on the brake, the piston being urged in the orifice-reducing direction as the brake pressure increases, a spring arranged to resist orifice-reducing movement of the piston, a pressure responsive member carried within said casing to be acted upon by the liquid metered through the two orifices, and a spring resisting movement of the pressure responsive member caused by pressure of said metered liquid.

4. For use in an aircraft landing gear comprising a strut adapted to be connected at its upper end to the body of the aircraft, a ground-engaging element which is pivotally supported on the lower end of the strut and which is arranged to "swing back" under load, and a fluid pressure operated brake associated with the ground-engaging element; a device for opposing "swing back" movement of the ground-engaging element comprising a telescoping shock absorber which shortens as the ground-engaging element "swings back," one end of the shock absorber being pivotally connected to the strut and the other end of the shock absorber being pivotally connected to the ground-engaging element, said shock absorber having a metering orifice through which liquid is forced when the shock absorber is shortened, a member providing a second metering orifice which communicates with the first metering orifice so that the liquid must be displaced through both orifices, a metering pin associated with the second metering orifice and arranged to reduce the effective area of said orifice as the pin is moved in a given direction, a piston operatively connected to the metering pin and acted on by a pressure proportional to the pressure acting on the brake, the piston being urged in the orifice-reducing direction as the brake pressure increases, a spring arranged to resist orifice-reducing movement of the piston, a floating piston carried within said casing to be acted upon by the liquid metered through the two orifices, and a spring resisting movement of the floating piston caused by pressure of said metered liquid.

5. For use in an aircraft landing gear comprising a ground-engaging element which is pivotally supported on the lower end of the landing gear and which is arranged to "swing back" under load, and a fluid pressure operated brake associated with the ground-engaging element; a device for opposing "swing back" movement of the ground-engaging element comprising a telescoping shock absorber, one end of which is adapted to be pivotally connected to a part of the aircraft and the other end of which is pivotally connected to the ground-engaging element, said shock absorber having a metering orifice through which liquid is forced, a second metering orifice which communicates with the first metering orifice so that the liquid must be displaced through both orifices, a metering pin associated with the second metering orifice and arranged to reduce the effective area of said orifice as the pin is moved in a given direction, a piston operatively connected to the metering pin and acted on by a pressure proportional to the pressure acting on the brake, the piston being urged in the orifice-reducing direction as the brake pressure increases, and resilient means for storing the energy of the metered liquid.

6. For use in an aircraft landing gear comprising a ground-engaging element which is pivotally supported on the lower end of the landing gear and which is arranged to "swing back" under load, and a fluid pressure operated brake associated with the ground-engaging element; a device for opposing "swing back" movement of the ground-engaging element comprising a telescoping shock absorber, one end of which is adapted to be pivotally connected to a part of the aircraft and the other end of which is pivotally connected to the ground-engaging element, said shock absorber having a pair of metering orifices through which liquid is forced, a metering pin arranged to move into and out of one of said metering orifices, said pin being substantially tapered in form to reduce the effective size of said one orifice as the pin is moved therein, a pressure responsive member operatively connected to the metering pin and acted on by a pressure proportional to the pressure acting on the brake, the pressure responsive member being urged in the orifice-reducing direction as the brake pressure increases, and resilient means for storing the energy of the metered liquid.

7. For use in an aircraft landing gear comprising a ground-engaging element which is arranged to "swing back" under load, and a fluid pressure operated brake associated with the ground-engaging element; a device for opposing "swing back" movement of the ground-engaging element comprising a telescoping shock absorber, one end of which is adapted to be pivotally connected to a part of the aircraft and the other end of which is pivotally connected to the ground-engaging element, said shock absorber having a pair of metering orifices through which liquid is forced, a substantially tapered metering pin associated with one of said metering orifices and arranged to reduce the effective area of said one orifice as the pin is moved in a given direction, and a pressure responsive member operatively connected to the metering pin and acted on by a pressure proportional to the pressure acting on the brake, the pressure responsive member being urged in the orifice-reducing direction as the brake pressure increases.

8. For use in an aircraft landing gear comprising a ground-engaging element which is arranged to "swing back" under load, and a fluid pressure operated brake associated with the ground-engaging element; a device for opposing "swing back" movement of the ground-engaging element comprising a telescoping shock absorber, one end of which is adapted to be pivotally connected to a part of the aircraft and the other end of which is pivotally connected to the ground-engaging element, said shock absorber having a first and second metering orifice through which liquid is successively forced, a substantially tapered metering pin associated with the second metering orifice and arranged to reduce the effective area of said second orifice as the pin is moved in a given direction, and a pressure responsive member operatively connected to the metering pin and acted on by a pressure proportional to the pressure acting on the brake, the pressure responsive member and metering pin being urged in the orifice-reducing direction to reduce the effective area of said second orifice in proportion to the degree of brake pressure applied.

9. For use in an aircraft landing gear comprising a ground-engaging element which is arranged to "swing back" under load, and a fluid pressure operated brake associated with the ground-engaging element; a shock absorber having a pair of communicating orifices through which fluid is forced, a metering pin associated with one of said metering orifices and arranged to reduce the effective area of said one orifice as the pin is moved in a given direction, and a pressure responsive member operatively connected to said metering pin and acted on by a pressure proportional to the pressure acting on the brake, the pressure responsive member being urged in the orifice-reducing direction as the brake pressure increases.

10. For use in an aircraft landing gear comprising a ground-engaging element which is arranged to "swing back" under load, and a fluid pressure operated brake associated with the ground-engaging element; a shock absorber having a pair of communicating orifices through which fluid is forced, and a pressure responsive member operably extending into one of said orifices, said member being acted on by a pressure proportional to the pressure acting on the brake to reduce the effective area of said one orifice as the brake pressure increases.

11. For use in an aircraft landing gear having a ground-engaging element and a brake associated with the ground-engaging element, a shock absorber having a pair of communicating orifices through which fluid is forced, one of said orifices being larger than the other during release of said brake, and a member operably extending into said one orifice, said member being acted on by a force proportional to the force acting on the brake to reduce the effective area of the orifice as the brake effectiveness increases.

12. A shock absorber having first and second communicating orifices through which fluid is successively forced, one of said orifices being normally larger than the other, a metering pin associated with the normally larger orifice and arranged to reduce the effective area of said normally larger orifice as the pin is moved in a given direction, and a fluid pressure responsive member operatively connected to the metering pin and acted on by a fluid pressure proportional to a brake-actuating pressure to urge the metering pin in the orifice-reducing direction as the brake pressure increases.

13. A shock absorber having first and second communicating orifices through which fluid is successively forced, one of said orifices normally having a larger effective area than the other of said orifices, and a fluid pressure responsive member acted on by a fluid pressure proportional to a brake-actuating fluid pressure and operably associated with said larger orifice in such a way as to control its said effective area.

14. For use in an aricraft landing gear comprising a strut adapted to be connected at its upper end to a part of the aircraft, a ground-engaging element which is pivotally supported on the lower end of the strut and which is arranged to "swing back" under load, and a brake associated with the ground-engaging element; a device for opposing "swing back" movement of the ground-engaging element comprising a casing having two cylindrical bores, a piston member reciprocable in the first bore, said piston member and the portion of said casing in which it reciprocates constituting a telescopic shock absorber which shortens as the ground-engaging element "swings back," one end of the shock absorber being pivotally connected to the strut and the other end of the shock absorber being pivotally connected to the ground-engaging element, said shock absorber having a metering orifice through which liquid is forced when the shock absorber is shortened, a fixed member in the second bore having a metering orifice which communicates with the first metering orifice so that the liquid must be displaced through both orifices, a metering pin associated with the second metering orifice and arranged to reduce the size of said orifice as the pin is moved in a given direction, an actuator operatively connected to the metering pin and acted on by a force proportional to the force acting on the brake, the actuator being urged in the orifice-reducing direction as the brake force increases, a spring which resists orifice-reducing movement of the actuator, a floating piston in the second bore acted on by the liquid metered through the two orifices, and a spring resisting movement of the floating piston caused by pressure of said metered liquid.

15. For use in an aircraft landing gear comprising a ground-engaging element which is pivotally supported on the lower end of the landing gear and which is arranged to "swing back" under load, and a brake associated with the ground-engaging element; a device for opposing "swing back" movement of the ground-engaging element comprising a telescopic shock absorber, one end of which is adapted to be pivotally connected to a part of the aircraft and the other end of which is pivotally connected to the ground-engaging element, said shock absorber having a metering orifice through which liquid is forced, a second metering orifice which communicates with the first metering orifice so that the liquid must be displaced through both orifices, a metering pin associated with the second metering orifice and arranged to reduce the size of said orifice as the pin is moved in a given direction, an actuator operatively connected to the metering pin and acted on by a force proportional to the force acting on the brake, the actuator being urged in the orifice-reducing direction as the brake force increases, a spring which resists orifice-reducing movement of the actuator, and resilient means for storing the energy of the metered liquid.

16. A variable resistance shock absorber having first and second communicating orifices through which fluid is successively forced, one of said orifices being normally larger than the other, and a fluid pressure responsive member which controls the orifice area of said normally larger orifice, said fluid pressure responsive member being actuated by the same fluid pressure which applies a brake.

17. A shock absorbing device comprising two telescopically arranged elements which define a variable volume chamber therebetween, a second variable volume chamber, a passage communicating said chambers, a first orifice in the passage, a second orifice in the passage normally having a greater effective area than said first orifice, a pressure responsive movable member carried within said second chamber and responsive to pressures created as a result of fluid flow through said passage, cushioning means acting on said member in opposition to the aforesaid pressures, a valve device arranged to control the communication of said pressures to said second chamber by varying the size of said second orifice, means urging said valve device in a direction to provide unrestricted communication through said second orifice, and a second pressure responsive movable member operatively connected to said valve device whereby operation of said second member will result in a variation in size of said second orifice.

18. A shock absorbing device comprising two telescopically arranged elements which define a variable volume chamber therebetween, a second variable volume chamber, a passage communicating said chambers, a first orifice in the passage, a second orifice in the passage normally having a greater effective area than said first orifice, a pressure responsive movable member carried within said second chamber and responsive to pressures created as a result of fluid flow through said passage, a valve device arranged to control the communication of said pressures to said second chamber by varying the size of said second orifice, means urging said valve device in a direction to provide unrestricted communication through said second orifice to said second chamber, and a second pressure responsive movable member operatively connected to said valve device whereby operation of said second member will result in a variation of the size of said second orifice.

19. For use with an aircraft landing gear having a ground-engaging element and a fluid pressure operated braking system associated with the ground-engaging element, a shock absorber having a first metering orifice through which fluid is forced, a second metering orifice in communication with said first orifice, means associated with said braking system for reducing the effective area of only one of said orifices upon application of fluid pressure to said system, and resilient means for storing the energy of the fluid passing through said orifices.

References Cited in the file of this patent

UNITED STATES PATENTS

| | | |
|---|---|---|
| Re. 22,255 | Dowty | Jan. 26, 1943 |
| 1,727,696 | Brequet | Sept. 10, 1929 |
| 1,821,419 | Boughton | Sept. 1, 1931 |
| 1,887,583 | Down | Nov. 15, 1932 |
| 2,014,339 | Messier | Sept. 10, 1935 |
| 2,039,135 | Waugh | Apr. 28, 1936 |
| 2,049,209 | Level | July 28, 1936 |
| 2,131,014 | Sanford | Sept. 20, 1938 |
| 2,181,161 | Wolf | Nov. 28, 1939 |
| 2,263,770 | Greve | Nov. 25, 1941 |
| 2,296,017 | Bound | Sept. 15, 1942 |
| 2,363,308 | Focht | Mar. 21, 1944 |
| 2,381,532 | Focht | Aug. 7, 1945 |
| 2,568,696 | Albright | Sept. 25, 1951 |

FOREIGN PATENTS

| | | |
|---|---|---|
| 265,650 | Great Britain | Feb. 9, 1927 |
| 650,084 | Great Britain | Feb. 14, 1951 |
| 849,751 | France | Aug. 21, 1939 |
| 950,592 | France | Mar. 28, 1949 |